United States Patent [19]
Kavis

[11] 4,196,939
[45] Apr. 8, 1980

[54] AUTO ANTI-THEFT SYSTEM

[76] Inventor: George Kavis, 355 E. 146th St., Harvey, Ill. 60426

[21] Appl. No.: 970,656

[22] Filed: Dec. 18, 1978

Related U.S. Application Data

[63] Continuation of Ser. No. 852,153, Nov. 16, 1977, abandoned.

[51] Int. Cl.² ............................................. B60R 25/08
[52] U.S. Cl. .................................... 303/89; 137/552.5; 180/287; 188/353
[58] Field of Search ............... 303/89; 137/552.5, 598; 180/114; 188/353; 192/3 H; 340/63; 70/175-178, 287, 288, 301, DIG. 37

[56] References Cited

U.S. PATENT DOCUMENTS

| | | | |
|---|---|---|---|
| 1,427,239 | 8/1922 | Spencer | 137/552.5 |
| 1,444,083 | 2/1923 | Porteous | 137/552.5 |
| 2,551,993 | 5/1951 | Benedek | 308/DIG. 11 |
| 4,027,923 | 6/1977 | Saito | 303/6 C |
| 4,040,675 | 8/1977 | Richmond | 303/89 |

*Primary Examiner*—Trygve M. Blix
*Assistant Examiner*—Reinhard J. Eisenzopf
*Attorney, Agent, or Firm*—Sabin C. Bronson

[57] ABSTRACT

A vehicle anti-theft device which is mounted on or in the instrument panel of said vehicle and which is connected into the brake fluid line that extends from the master cylinder to the brake wheel cylinders. By closing the valve while the vehicle brake pedal is depressed, fluid under pressure is trapped between the anti-theft device and the wheel brake cylinders, locking the wheels. The closed valve prevents reverse flow of the pressurized braking fluid until an authorized person in possession of the proper dial symbol to reference mark combination once again manually reorientates the set of dials that are attached to a plurality of cylinder valve port tubes and one spool that are rotated in proper sequence to bring all the tube ports in alignment with the casing ports. The valve consists of a body or casing and a plurality of cylindrical valve port tubes and one valve port spool (preferred number being three) the largest of which slips into the casing bore with each of the other cylinders or spools of progressively decreasing diameters their outside diameters fitting each of the compatible inside diameters, and then are held in that position by a securing device at each end; in the case shown, snap rings at one end and calibrated dials at the opposite end. The combination feature eliminates the inconvenience of carrying an extra key such as is required in the cases of some prior art.

1 Claim, 3 Drawing Figures

AUTO ANTI-THEFT SYSTEM

This is a continuation of application Ser. No. 852,153, filed Nov. 16, 1977 now abandoned.

BACKGROUND AND SUMMARY OF THE INVENTION

The present invention relates generally to a vehicle anti-theft device, not necessarily restricted to vehicles since it can be applied to any hydraulic or pneumatic brake system of automobiles, trucks, heavy equipment, aircraft or machines, and more particularly to an improved device of the type that advantageously uses the system's braking fluid to prevent movement, unless by an authorized user.

Anti-theft devices that take advantage of the brake fluid principle and the rotary valve port disorientation principal are already well known and exemplified by U.S. Pat. Nos. 1,433,709, 1,527,670, 3,468,586, 3,515,442, 3,617,100, 3,653,730, 3,800,279 and 4,018,314.

U.S. Pat. Nos. 3,653,730 and 4,018,314 give adequate summary of the reasoning for the need for such a device.

Of all the patents listed in the foregoing, only U.S. Pat. Nos. 1,433,709 and 1,527,670, although for gasoline systems which would require the device to be mounted outside the passenger compartment due to explosive atmosphere and U.S. Pat. No. 3,468,586, are devised on the principle or rotary valve port disorientation. To anyone familiar with the art, it can easily be seen that similarity of design and construction is totally lacking between the patents noted and this new innovation of construction.

DESCRIPTION OF THE PREFERRED EMBODIMENT

Figure 3:
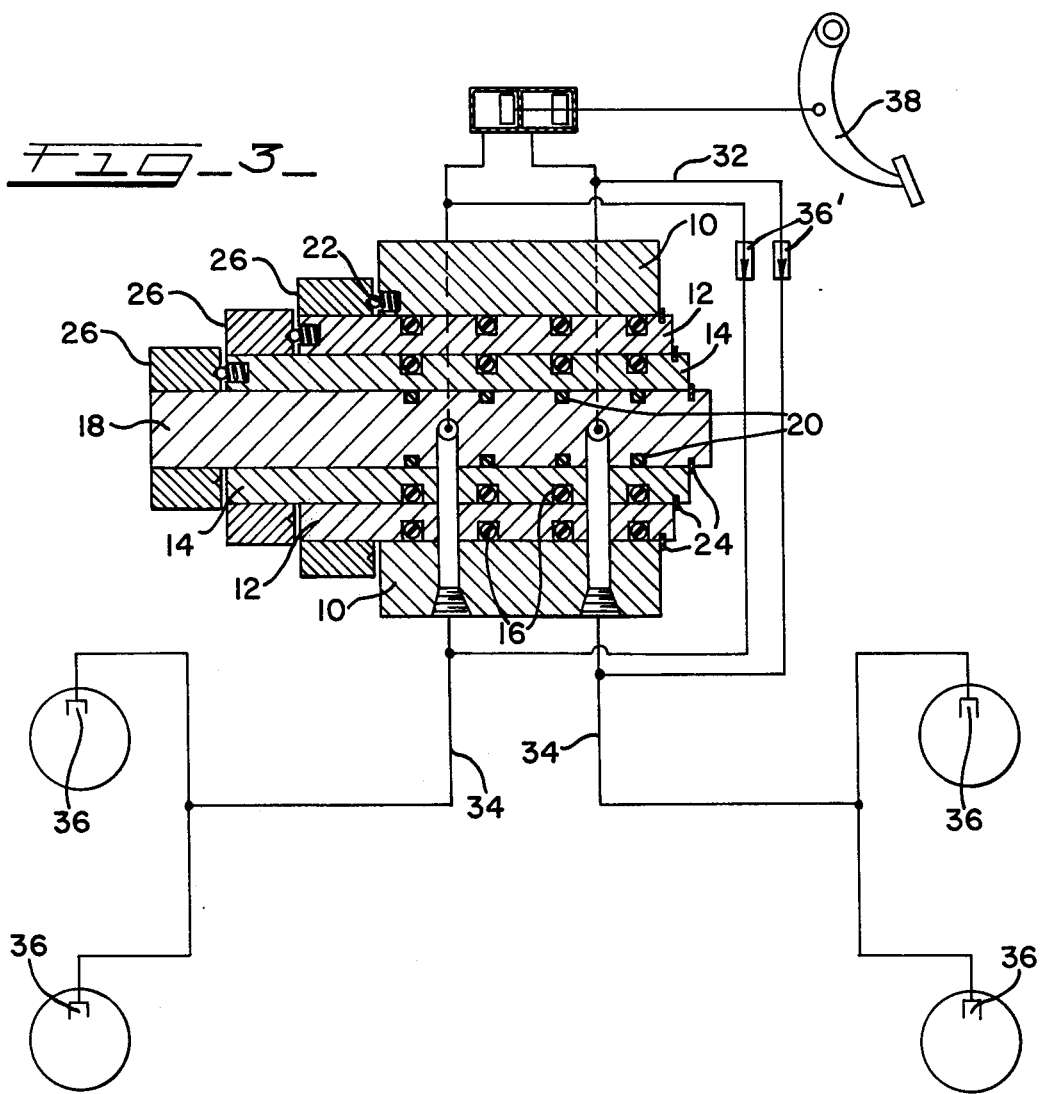
FIG. 3 is a section through the device on the line 3—3 of FIG. 1 showing internal assembly and also showing schematically how the device would fit into the brake fluid system of a vehicle.

Referring to FIG. 3 it will be apparent that the device includes a solid casing or main body 10 with a bore and piping inlets and outlets. Two cylindrical valve port tubes 12 and 14, with "O" rings 16 incorporated into suitable grooves in their outside diameter, fit succesively in the bore of main body 10. One valve port spool 18 with "O" rings 20 incorporated into suitable grooves in its outside diameter, snugly fits within the valve port tube 14. Each of the valve port tubes and spool held in its respective place within the casing by snap rings 24 at one end of the device, and the calibrated dials 26 at the opposite end of the device. Each of the calibrated dials are held firmly in any given rotational position by spring plungers 22 whose moveable tip positions itself in a dent in the back side of each dial 26 that corresponds with each calibration marking inscribed on the front of the dial, thereby preventing longitudinal misalignment of port spool and port tube with valve body inlet and outlet independently of seal wear.

Figure 1:
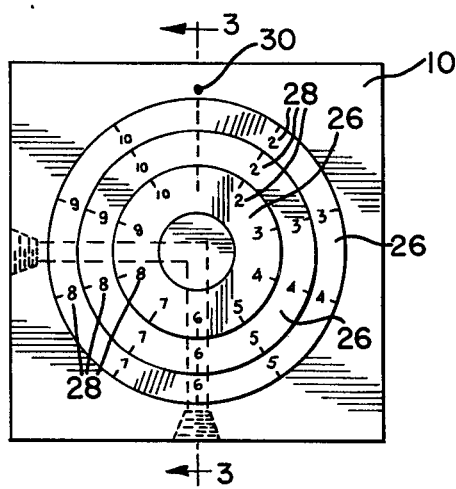
FIG. 1 is a front view of the device showing the casing body with port pipe connection and master orientation reference mark. Three calibrated dials are attached to the two cylindrical port tubes and the port spool, and in phantom all the tube ports in proper orientation with the casing ports.

Referring to FIG. 1 and FIG. 3 it is obvious that when the plurality of dials are turned to bring each individual dial symbol 28 into proper orientation with the casing reference mark 30 the plurality of valve port tubes 12 and 14 and the valve port spool 18 that are connected to these dials also bring their valve ports into proper alignment with the valve ports in the valve casing 10. This allows the free flow of brake fluid in either direction through the piping 32 and 34 of the device. But, retrograde flow is not allowed through the check valves 36'.

The preferred sequence of dial operation is the positioning of the larger dial 26 first, to allow it to be held in firm position by its dent and companion spring plunger 22, and then rotating each smaller dial 26—26 to its proper position to accomplish the proper combination.

Figure 2:
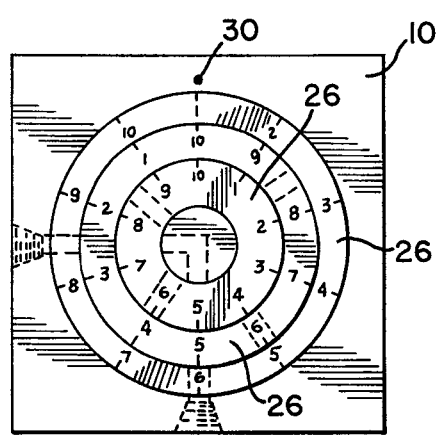
FIG. 2 is a front view of the device showing in phantom the tube ports in dis-orientation to the casing ports.

Referring to FIGS. 2 and 3 it is again apparent that when the plurality of dials 26 are turned so that their individual symbols 28 are at random position to the reference mark 30 on the casing, while the brake fluid is in a pressurized state, by depressing the brake pedal 38 the pressurized brake fluid will be trapped in the piping 34 between the wheel brake cylinders 36 and the device. The escapement of pressurized brake fluid between the two port conduit paths in the device is prevented by the close dimetrial fit of each successive bore of the parts and the "O" rings 20 and snap rings 24 even though the ignition key to said vehicle is obtained by a person other than authorized, but not in possession of the combination of the device dials.

The purpose of the check valves 36', which may be internally mounted, is that it may on occasion happen that the authorized person upon disorientating the dials 26 for locking purposes, may find upon testing the vehicle, by depressing the accelerator slightly, a recommended procedure, before turning off said vehicle engine, that not enough brake fluid pressure exists in entrapment. This can quickly be remedied without the inconvenience of reorientating the dials 26 by simply depressing the brake pedal and forcing more brake fluid into entrapment through check valves 36'.

It can further be understood by anyone having knowledge of the art that disconnection of any piping for purposes of by-passing the device would introduce air into the system and thus make it fully inoperative.

I claim:

1. An auto anti-theft device for an automobile fluid brake system, said device being connected in series with the brake fluid line between the master cylinder and the wheel brake cylinders, and comprising; a valve body having an axial bore therethrough and a master reference on its end, a pair of brake fluid inlet and outlet ports in said body, a plurality of telescopic cylindrical straight walled valve port tubes rotatably mounted within the bore of the valve body, a valve port spool within one of said valve port tubes, said spool having two ends of substantially equal diameter, a plurality of spaced grooves along the surfaces of the valve port spool and the valve port tubes on opposite sides of said inlet and outlet ports, an O-ring seal within each of said grooves, snap rings at one end of each valve port tube and valve port spool to hold same in a respective place within the valve body, calibrated dials at the opposite end of said port spool and port tubes, a spring device between each dial and end of valve body and tubes to assure proper longitudinal alignment of said port spool and said port tubes with said body inlet and outlet independently of said seal wear.

* * * * *